United States Patent Office 2,972,547
Patented Feb. 21, 1961

2,972,547

ACYL HYDRAZINE COMPOSITIONS AND METHODS OF PRODUCING COLOR THEREWITH

Jack M. Tien, 3018 Barnes Ave., Bronx, N.Y., assignor to Antioch College, Yellow Springs, Ohio, a corporation of Ohio, Tsu Sheng Ma, New York, N.Y., I. Moyer Hunsberger, Amherst, Mass., and Jack M. Tien, Mount Vernon, N.Y.

No Drawing. Filed Aug. 5, 1957, Ser. No. 676,416

26 Claims. (Cl. 106—266)

This invention relates to the new coloring matters, more particularly to the new coloring matters of the acyl hydrazine series having the formula

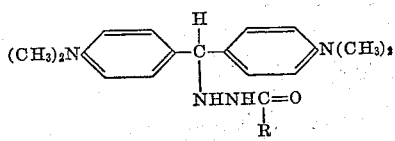

wherein COR is an organic carboxylic acid acyl group and R is a monovalent radical, defined later herein, selected from the group consisting of alkyl, phenyl, substituted phenyl, naphthyl, halogen substituted naphthyl, pyridyl, substituted pyridyl, pyrimidyl, thienyl, substituted thienyl, furyl, and substituted furyl.

The present application is a continuation-in-part of my copending application Serial No. 562,795, filed February 1, 1956, now U.S. Patent 2,939,009, and is particularly directed to the coloring composition of the novel compounds as defined hereinabove, and to the method of producing color from them.

The new coloring matters are essentially colorless in their normal state, yet are capable of generating color immediately upon being brought into sufficiently intimate contact with a color initiator which is an acid relative to the coloring matters such as silicates, common acids, heteropolyacids, and phenolic material. The contact may be achieved by the use of solvents; and by the use of heat or pressure with or without solvents.

Examples of silicates are clays, silica gel, aluminum silicate type of cation exchangers suitably in hydrogen form such as Decalso, zeolite and Permutit Folin. Examples of common acids are acetic acid, boric acid, fatty acids, organic solid sulfonic acids, adipic acid, sebacic acid, citric acid, citrazinic acid, and H-cation-exchange resins. Examples of heteropolyacids are phosphotungstic acid, phosphomolybdic acid, phosphotungstomolybdic acid, molybdophosphotungstic acid, silicotungstic acid, and silicomolybdotungstic acid. Examples of phenolic materials are catechol, alkyl substituted catechol, gallic acid, lower alkyl gallate, pyrogallic acid, tannic acid, phloroglucinol, salicylic acid and phenolic resins.

The novel compounds of my invention are cheap to manufacture, stable in storage and in handling, and useful as a principal source of the colorless form of a coloring agent for fibers, for paints and particularly for duplication processes, such as carbon paper, manifold paper, heat sensitive paper, master sheets for hectograph printing, ink for stenciling, typewriter ribbon, finger and foot printing and the like.

The color varies with the nature of the acyl hydrazine and especially with the nature of the contact material and the solvents. For instance most of the acyl hydrazines produce a purple color on being rubbed with kaolin clay; a green color with n-propyl gallate or phloroglucinol; a blue color with citric acid, salicylic acid, phosphotungstic acid or hydrogen form of cation-exchange materials; and a first blue, then a substantially white and finally a jet black color with pyrogallic acid. For instance, 1-bis(4-dimethylaminophenyl)methyl-2-(2, 4-dichlorobenzoyl)hydrazine in liquid chlorinated biphenyl gives a blue color on attopulgite clay. The color with this clay is purple, when the chlorinated biphenyl solvent is replaced by methanol, ethanol, ethyl adipate or ethyl sebacate.

The color fastness may be varied to some extent by the choice of the contact material. Although the resistance to fading of the purple color produced by certain clays are moderate, the blue color produced by phosphotungstic acid and also the black color produced by pyrogallic acid are permanent.

One way to manufacture my compounds involves reaction of the selected acid hydrazide with Michler's Hydrol which is bis(4-dimethylaminophenyl)methanol, suitably in polar solvents such as methanol, ethanol and dioxane according to the equation:

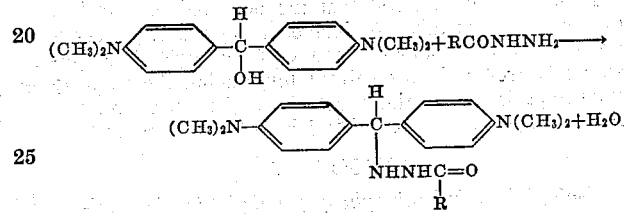

R, as used here and elsewhere herein, is a monovalent group such as any $C_1$ to $C_{20}$ alkyl group of which examples are lauryl, myristyl, palmityl, and stearyl; phenyl and substituted phenyl of the formula

such as dichlorophenyl, chloro-nitrophenyl and 4-methoxyphenyl; pyridyl and substituted pyridyl of the formula

such as 2,6-dichloro-4-pyridyl, 2,6-dihydroxy-4-pyridyl and tetrachloro-4-pyridyl; thienyl and substituted thienyl of the formula

such as chloro-2-thienyl, nitro-2-thienyl and methyl-2-thienyl; furyl and substituted furyl of the formula

such as chloro-2-furyl, nitro-2-furyl and methyl-2-furyl; pyrimidyl; and naphthyl and halogen substituted naphthyl; and $X_1$ to $X_5$ are hydrogen, halogen, hydroxy, lower alkyl, lower alkoxy and nitro radicals.

I have accurately defined my invention, its scope, and its uses. Now I shall proceed to illustrate but not limit my invention by the following detailed examples:

EXAMPLE 1

*1-bis(4-dimethylaminophenyl)methyl-2-benzoylhydrazine*

A mixture of 2.9 g. benzoic acid hydrazide and 5.7 g. Michler's Hydrol in 60 ml. absolute ethanol is refluxed for about three hours. On standing overnight, the solution deposits a dark semisolid, which is filtered and decolorized with activated charcoal in boiling benzene solution. The crude product which precipitates on addition of petroleum ether is collected, redissolved in hot benzene, and diluted with petroleum ether. On cooling, colorless prisms are obtained.

EXAMPLE 2

*1-bis(4-dimethylaminophenyl)methyl-2-(3-nitrobenzoyl) hydrazine*

To a solution of 3.6 g. 3-nitrobenzoic acid hydrazide in 65 ml. absolute ethanol is added 6 g. Michler's Hydrol. The resulting mixture is heated under reflux for three hours. The dark precipitate which forms on cooling is separated by filtration. The crude product is recrystallized from hot benzene with the use of activated carbon to yield tiny light orange-yellow needles. The para isomer which may be prepared in the same way with the same molecular proportion of reagents also is a light orange-yellow crystalline material, as are the 2-chlor-5-nitro- and the 4-chloro-3-nitrobenzoylhydrazines.

It is to be understood that the designation, colorless or color free, is taken to include a light orange-yellow color, since so small an amount of the crystalline substance is present in the solvent for making the coloring fluid that is substantially colorless. Furthermore, the light orange-yellow color itself is not a dye color.

EXAMPLE 3

*1-bis(4-dimethylaminophenyl)methyl-2-isonicotinylhydrazine*

3.5 g. isonicotinic acid hydrazide and 6.8 g. Michler's Hydrol in 100 ml. absolute ethanol are heated under reflux for about four hours. After cooling, the precipitate is filtered, dissolved in hot benzene, and decolorized with activated charcoal. From the hot filtrate small sparkling colorless cubic crystals separate rapidly.

The isonicotinic acid hydrazide may be replaced by one of the following compounds: the hydrazide of nicotinic acid, 2-picolinic acid, tetrachloroisonicotinic acid, 2,6-dichloroisonicotinic acid, 2,6-dihydroxyisonicotinic acid, and 2,6-dihydroxy-3,5-dichloroisonicotinic acid in the same molecular proportions. Each of the products is a colorless crystalline material.

EXAMPLE 4

A. *Intermediate 2,4-dichlorobenzoic acid hydrazide*

10 g. ethyl 2,4-dichlorobenzoate and 4 ml. anhydrous hydrazine in 50 ml. ethanol are refluxed for about one hour. Long colorless needles crystallize out on cooling. They are washed with water and recrystallized from hot methanol. Acid chloride may be used instead of the ester provided that the reaction is performed with cooling.

B. *1-bis(4-dimethylaminophenyl)methyl-2-(2,4-dichloro benzoyl)hydrazine*

A mixture of 3.4 g. 2,4-dichlorobenzoic acid hydrazide and 4.8 g. Michler's Hydrol in 50 ml. absolute ethanol is heated under reflux for about four hours. After stripping off most of the solvent, the crude product which separates on cooling is collected, dissolved in hot benzene and treated with clay or activated charcoal. The addition of petroleum ether to the benzene filtrate produces an almost white precipitate which is recrystallized from hot benzene, yielding colorless prisms.

The 2,3-; 2,5-; 2,6-; 3,4-; or 3,5-dichloroisomer may be prepared as white crystalline substance through the same process.

EXAMPLE 5

A. *Intermediate mixed dichlorobenzoic acid hydrazide*

Chlorine is passed into 5.6 g. of benzoyl chloride containing 0.04 g. fine iron powder and 0.02 g. iodine at 50° to 60° C. until there is an increase in weight of 3.2 g. After removal of the free chlorine and hydrogen chloride by sucking air through the mixture, the net increase in weight is reduced to 2.8 g., which corresponds to the theoretical quantity. While the crude dichlorobenzoyl chloride may be used to prepare the corresponding hydrazides by direct treatment with hydrazine, it is advantageous first to esterify it by refluxing the crude material for about one hour with 25 ml. absolute ethanol and 4 ml. pyridine. After removal of ethanol by evaporation, the oily residue is washed thoroughly with water to remove pyridine and any chlorides and is heated under reflux for two to three hours with 3 ml. anhydrous hydrazine in 25 ml. ethanol. The resulting solution is poured with stirring into a large volume of water. The white solid product is collected.

B. *1-bis(4-dimethylaminophenyl)methyl-2-dichlorobenzoylhydrazine*

The same procedure as in Example 4B then produces a white solid substance.

The other color-free acyl hydrazines may be prepared by condensation of Michler's Hydrol with their corresponding acid hydrazides in the same manner as in above examples, such as 1-bis(4-dimethylaminophenyl)methyl-2-lauroylhydrazine, 1-bis-(4-dimethylaminophenyl)methyl-2-myristoylhydrazine, 1-bis(4-dimethylaminophenyl) methyl - 2 - palmitoylhydrazine, 1-bis(4-dimethylaminophenyl)methyl-2-stearoylhydrazine and the others.

The coloring composition consists of an acyl hydrazine derivative as defined herein above and an initiator of color development in sufficient contact with the said compound. The initiator is an acidic substance relative to the acyl hydrazines of which examples are aluminum silicates, magnesium trisilicate, silica gel, clays, heteropolyacids, cation-exchangers, and phenols.

The method of producing color is to bring the colorless acyl derivative into sufficiently intimate contact with a color initiator. This phase of the invention will be illustrated by the following examples:

EXAMPLE 6

An attapulgite clay known as Attasorb RVM is sieved on to a sheet of paper. When a colorless solution containing 1% coloring matter of Example 4B in methanol, ethanol, or dioxane is dropped on the clay, a deep purple or violet spot is produced instantaneously. If the clay is replaced by citric acid, the spot is deep blue.

EXAMPLE 7

The color-free fluid containing 0.5% coloring matter of Example 3 in liquid chlorinated biphenyl, Arochlor 1242) is applied on a finger in the form of a thin film. As quickly as a paper bearing a clay-like material, such as NCR paper, is pressed against the finger, a clear and intense blue image of the finger print is duplicated on said paper; yet no color develops on the finger. If the chlorinated biphenyl is replaced by diethyl adipate or sebacate, the finger print image is purple.

EXAMPLE 8

A pure white mixture of 96 g. U.S.P. kaolin clay and 4 g. coloring matter of Example 4B is placed on a white index card in the form of a thin layer. On being put on a hot iron, or exposed to infrared radiation, the mixture immediately turns blue. But the color of the mixture is purple when rubbed with a spatula. If the clay is replaced by boric acid, the color developed by heat is deep purple, while the color developed by forceful pressure is blue. However, the blue color produced either by the use of heat or pressure remains unchanged, if the clay is replaced by any one of the initiators below: adipic acid, citric acid, citrazinic acid, gallic acid, salicylic acid, phosphotungstic acid, silica gel, tannic acid, cation-exchange materials.

EXAMPLE 9

A hemically neutral paper is coated with a molten mixture of the following materials:

| | G. |
|---|---|
| White paraffin wax | 20 |
| White paraffin oil (U.S.P. heavy) | 7 |
| Chlorinated biphenyl (Arochlor 1248) | 23 |
| Coloring matter of Example 4B | 4 |
| White beeswax, U.S.P. | 26 |
| Carnauba wax, neutralized | 20 |

The resulting coated paper is essentially color-free and stable against discoloration in storage and in handling. When this paper is positioned in surface contact with a paper bearing a cation exchange material or clay-like material, a blue image, pattern or letter is produced by the use of a pencil, stylus or typewriter.

EXAMPLE 10

A T-shaped image or pattern is coated on to a sheet of chemically neutral paper by means of a stencil with a homogeneous molten mixture of the following formulation:

| | G. |
|---|---|
| Chlorinated biphenyl (Arochlor 1242) | 30 |
| Coloring matter of Example 1 | 20 |
| Hydrogenated castor oil (Opalwax) | 10 |
| Carnauba wax, neutralized | 10 |
| Beeswax, U.S.P. | 30 |

As soon as the clay side of a methanol-moistened NCR paper is pressed against the coated sheet, a purple T which becomes blue in seconds and finally returns to purple color is duplicated on the NCR paper.

EXAMPLE 11

A piece of chemically neutral cotton fabric (1" by 4") is impregnated with 5 ml. ethanol solution containing 0.1% colorless coloring matter of Example 4B and dried. On being dipped into a 50° to 60° C. water bath containing 1% phosphotungstic acid, the treated cloth turns sky blue instantaneously and permanently, yet the water bath remains crystal clear and colorless.

The acyl hydrazine coloring matters in the above examples may be carried in the carriers such as wax, mineral oil, vegetable oil, chlorinated biphenyl, and diester of a dibasic acid. The resulting mixture then may be dispersed in the water containing film forming agents to obtain a coating composition for duplication process. The suitable film forming agent is an organic hydrophilic colloid material of which examples are starch, gelatin, casein, arabic gum, methyl cellulose, and polyvinyl alcohol. The resulting mixture may also be contained in the microcapsules of the hydrophilic colloid material to obtain the coating composition. As these types of coating are well known in the art, they need not be detailed by examples.

What is claimed is:

1. A substantially colorless composition adapted for use as a coloring agent consisting essentially of an acyl hydrazine derivative of 1-bis(4-dimethylaminophenyl)-methane, having the following structural formula

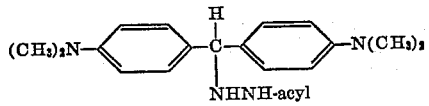

wherein acyl is a carboxylic acid acyl and at least one acidic substance capable of rapidly producing a distinct color, said acid substance and said hydrazine derivative being physically separated from each other by at least one film-forming agent.

2. A substantially colorless composition adapted for use as a coloring agent consisting essentially of a compound of the formula

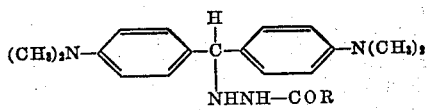

wherein R is a monovalent radical selected from the group consisting of an alkyl having from one to seventeen carbon atoms inclusive, carbocyclic of the aromatic series, nitrogen-cyclic of the pyridine series, sulfur-cyclic of the thiophene series and oxygen-cyclic of the furn series, and at least one solid acidic substance capable of rapidly producing a distinct color, said acidic substance and said compound being physically separated from each other by at least one film-forming agent.

3. The composition of claim 1 in which the acyl is an aroyl and the acidic substance contains a phosphoheteropolyacid.

4. The composition of claim 2 in which the major portion of the acidic substance is a hydrated aluminum silicate.

5. The composition of claim 2 in which the acidic substance is a phenol.

6. A substantially colorless composition adapted for use as a coloring agent consisting essentially of a compound of the structural formula

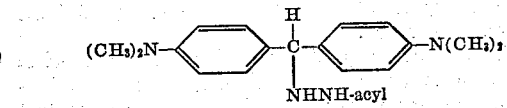

wherein acyl is an aroyl of the benzene series and at least one heteropolyacid selected from the group consisting of phosphotungstic acid, phosphomolybdic acid and phosphotungstomolybdic acid, said compound and said acid being physically separated from each other by at least one film-forming agent.

7. The composition of claim 1 in which the acyl is a halogenated aroyl and the acidic substance contains a hydrated aluminum silicate.

8. The composition of claim 6 in which the acyl is a chlorinated aroyl of the benzene series.

9. A colorless composition adapted for use as a coloring agent consisting essentially of 1-bis(4-dimethylaminophenyl)methyl-2-dichlorobenzoylhydrazine and at least one heteropolyacid selected from the group consisting of phosphotungstic acid, phosphomolybdic acid and phosphotungstomolybdic acid, said hydrazine and said acid being physically separated from each other by at least one film-forming agent.

10. The composition of claim 6 in which the acyl is a nitrated aroyl of the benzene series.

11. The composition of claim 1 in which the acyl is a carboxylic acid acyl of the pyridine series and the acidic substance contains a phosphoheteropolyacid.

12. A method of producing a distinct color which comprises bringing a 1-bis(4-dimethylaminophenyl)methyl-2-aroylhydrazine into intimate contact with at least one acidic substance containing a heteropolyacid selected from the group consisting of phosphotungstic acid, phosphomolybdic acid and phosphotungstomolybdic acid, said aroyl hydrazine having not more than 14 ring-carbon atoms.

13. The method of producing a vivid color which comprises bringing a substantially colorless 1-bis(4-dimethylaminophenyl)methyl - 2 - (chlorinated - benzoyl) hydrazine into intimate contact with at least one heteropoly acid selected from the group consisting of phosphotungstic acid, phosphomolybdic acid and phosphotungstomolybdic acid.

14. The composition of claim 6 in which the acyl hydrazine is carried in at least one inert vehicle.

15. The composition of claim 8 in which the acyl hydrazine is carried in at least one inert vehicle, said vehicle containing a waxy material.

16. The composition of claim 6 in which the acyl hydrazine is carried in at least one inert vehicle selected from the group consisting of oily and waxy substances and the film-forming agent is a hydrophilic material.

17. A substantially colorless composition adapted for use as a coloring agent consisting essentially of a 1-bis(4-dimethylaminophenyl)methyl - 2 - chlorobenzoylhydrazine and at least one heteropolyacid selected from the group consisting of phosphotungstic acid, phosphomolybdic acid and phosphotungstomolybdic acid, said hydrazine and said acid being physically separated from each other by at least one film-forming material.

18. A colorless composition adapted for use as a coloring agent consisting essentially of a compound of the formula

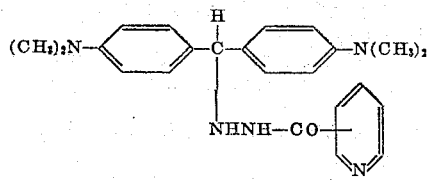

and at least one acidic substance capable of producing a vivid color, said acidic substance and said compound being physically isolated from each other by at least one film-forming agent.

19. The method of producing color which comprises bringing a substantially color-free 1-bis(4-dimethylaminophenyl)methyl-2-aroylhydrazine into intimate contact with at least one hydrated aluminum silicate.

20. A method of producing color from the composition of claim 2, which comprises bringing said compound into intimate contact with said at least one acidic substance.

21. The method of producing color from the composition of claim 7, which comprises bringing said acyl hydrazine derivative into intimate contact with said at least one acidic substance.

22. A method of developing color in a substantially colorless image produced essentially from the composition of claim 6, which comprises bringing said compound into intimate contact with said acid.

23. A method of producing color in a substantially colorless pattern made essentially from the compound of claim 19, which comprises bringing said pattern into intimate contact with said at least one silicate.

24. A support, the surface of which is colored by intimately contacting the colorless acyl hydrazine derivative as defined in claim 7 with at least one acidic substance of claim 7.

25. A thin flexible sheet material of substantially uniform thickness, the surface of which is colored by intimately contacting the compound of claim 6 with the acidic substance of claim 6.

26. Fibers colored by intimately contacting the compound of claim 8 with the acidic substance of claim 8.

References Cited in the file of this patent

UNITED STATES PATENTS

| | | |
|---|---|---|
| 1,232,552 | Immerheiser | July 10, 1917 |
| 2,190,732 | Reddelian et al. | Feb. 20, 1940 |
| 2,195,258 | Pierce | Mar. 26, 1940 |
| 2,374,862 | Green | May 11, 1945 |
| 2,505,471 | Green | Apr. 25, 1950 |
| 2,589,306 | Steiner | Mar. 18, 1952 |
| 2,596,069 | Fox | May 6, 1952 |
| 2,634,677 | Klimkowski et al. | Apr. 14, 1953 |
| 2,795,504 | Klimkowski et al. | June 11, 1957 |

FOREIGN PATENTS

| | | |
|---|---|---|
| 209,399 | Australia | Nov. 8, 1956 |
| 126,124 | Switzerland | Dec. 23, 1925 |
| 517,656 | Belgium | Aug. 13, 1953 |